United States Patent [19]
O'Connor

[11] Patent Number: 5,846,370
[45] Date of Patent: Dec. 8, 1998

[54] RAPID PROTOTYPING PROCESS AND APPARATUS THEREFOR

[75] Inventor: Kurt Francis O'Connor, Carmel, Ind.

[73] Assignee: Delco Electronics Corporation, Kokomo, Ind.

[21] Appl. No.: 819,643

[22] Filed: Mar. 17, 1997

[51] Int. Cl.$^6$ .................................................. B29C 35/08
[52] U.S. Cl. ................... 156/272.8; 156/275.5; 156/379.8; 156/381; 264/401; 264/497; 264/85
[58] Field of Search ............................ 156/272.8, 273.3, 156/275.5, 379.8, 381, 62.2; 264/401, 497, 85, 125, 126, 308, 113

[56] References Cited

U.S. PATENT DOCUMENTS

| | | | |
|---|---|---|---|
| 4,863,538 | 9/1989 | Deckard | 156/62.2 |
| 5,296,081 | 3/1994 | Morin et al. | 156/498 |
| 5,342,919 | 8/1994 | Dickens, Jr. et al. | 528/323 |
| 5,622,577 | 4/1997 | O'Conner | 156/272.8 |
| 5,658,412 | 8/1997 | Retallick | 156/272.8 |

*Primary Examiner*—Michael W. Ball
*Assistant Examiner*—Michael A Tolin
*Attorney, Agent, or Firm*—Jimmy L. Funke

[57] ABSTRACT

A rapid prototyping process and apparatus by which prototype components can be fabricated for conceptual evaluations. The rapid prototyping process entails the steps of forming a prototype within a process chamber that generates the prototype on a platform of a build chamber through sequentially depositing a layer of material on the platform, fusing the layer of material together, and then lowering the platform so as to allow depositing of a subsequent layer of material on the platform. In this manner, the depositing, fusing and lowering steps are repeated until the desired prototype is obtained. Thereafter, the build chamber, housing the prototype, is detached from the process chamber, and the prototype is cooled while remaining within the build chamber. The prototype is preferably cooled within the build chamber using a nonreactive cooling medium that is caused to flow around the prototype. The build chamber is specially adapted to be used as a cooling chamber that can be readily attached and detached from the process chamber, such that exposure of the prototype to a reactive atmosphere is avoided or at least minimized.

20 Claims, 1 Drawing Sheet

RAPID PROTOTYPING PROCESS AND APPARATUS THEREFOR

FIELD OF THE INVENTION

The present invention generally relates to rapid prototyping processes used in the fabrication of conceptual models and prototypes. More particularly, this invention relates to a rapid prototyping process that entails a sintering operation performed in a primary process chamber that includes a detachable build chamber that serves as a cooling chamber.

BACKGROUND OF THE INVENTION

The fabrication of prototypes has long been a technique employed to evaluate the conceptual and functional feasibility of articles proposed for manufacture. Traditional prototyping techniques have generally entailed designing a component, followed by the manufacture of tooling from which the prototype is produced. While computer-aided design (CAD) techniques have become widely used in the design of both prototype and manufactured components, the conventional reliance on manufactured tooling to physically produce a prototype has been the dominating factor in determining when a prototype will become available, particularly for prototypes having complex geometries.

To reduce this lead time, CAD techniques have become more fully integrated with computer-aided manufacturing (CAM) techniques to eliminate the requirement for prototype tooling. Such methods include "rapid prototyping" (RP) processes, which generally entail the fabrication of a prototype from a material that is selectively cured or fused to form a unitary prototype. With rapid prototyping techniques, the period between prototype design and delivery can often be drastically reduced from several months required to fabricate prototype tooling, to as little as a few days.

Variations of rapid prototyping processes exist, with primary differences being the type and condition of the material being used to form the prototype, and the manner in which the material is fused or cured. Various materials can potentially be used, including powdered plastics, metals and ceramics. One known process involves the use of a photosensitive polymer in a liquid form. The liquid polymer is contained in a vat and successively cured in a manner that results in cured layers being successively fused together to form a unitary prototype. Suitable materials for this particular process are those that can be cured through exposure to a high-intensity light source, such as a laser beam, and include such materials as ceramics, metals and polymers, including polycarbonates, nylons and investment casting waxes.

Regardless of the type of material used, rapid prototyping processes are generally adapted to quickly and accurately deposit several thousand individual layers, each having a thickness of typically less than about 0.5 millimeter, and fuse the deposited layers to form a desired prototype. Computer data and a machine controller controls the entire process such that only selective portions of the material are cured or fused in order to achieve the desired geometry for a given prototype.

While the fabrication of prototypes in the above manner eliminates the requirement for prototype tooling, further improvements in process efficiency would be desirable. A significant shortcoming of prior art rapid prototyping techniques is the common requirement that the prototypes be sintered and cooled within a processing chamber containing an atmosphere that will not chemically react with, and therefore weaken, the sintered prototype, such as by oxidation. Cooling generally requires several hours, during which time a suitable nonreactive gas is flowed through the processing chamber. Consequently, the chamber is nonproductive during the cooling phase of the process, such that the overall efficiency of the process is significantly reduced.

Accordingly, it would be desirable if a rapid prototyping process existed by which a prototype could be fabricated from fused materials, yet avoided the requirement of employing a single chamber for all of the steps entailed in the process.

SUMMARY OF THE INVENTION

It is an object of this invention to provide a rapid prototyping process for the fabrication of prototypes.

It is a further object of this invention that such a process employs materials that can be selectively and sequentially fused or sintered.

It is another object of this invention that such a process employs a primary process chamber having a platform on which the step of sintering or fusing occurs, wherein the platform forms part of a build chamber that can be separated from the process chamber to free the primary process chamber for immediate use in a subsequent cycle.

In accordance with a preferred embodiment of this invention, these and other objects and advantages are accomplished as follows.

According to the present invention, there is provided a rapid prototyping process by which prototype articles can be fabricated that are suitable for conceptual studies and preliminary evaluations. The rapid prototyping process of this invention is more efficient than comparable prior art processes, in that the previous requirement to completely process a prototype article within a single process chamber is avoided, such that different process steps can be conducted simultaneously on different prototype articles within a single process system.

In accordance with this invention, the rapid prototyping process entails the steps of forming a prototype within a process chamber that generates the prototype on a platform of a build chamber through sequentially depositing a layer of material on the platform, fusing the layer of material together, and then lowering the platform so as to allow depositing of a subsequent layer of material on the platform. In this manner, the depositing, fusing and lowering steps can be repeated until the desired prototype is obtained. Thereafter, the build chamber, housing the prototype, is detached from the process chamber, and the prototype is cooled while remaining within the build chamber. The prototype is preferably cooled within the build chamber using a nonreactive cooling medium that completely envelops the prototype.

In accordance with this invention, the build chamber is specially adapted to be used as a cooling chamber that can be readily attached and detached from the process chamber, such that exposure of the prototype to a reactive atmosphere is avoided or at least minimized. To further minimize the reactivity of the prototype, the present invention may employ an additional sintering step that serves to render the surface of the prototype relatively impervious to reactive agents. In addition, an inert gas can be flowed over the prototype prior to detaching the build chamber from the process chamber in order to protect the prototype.

From the above, it can be seen that a significant advantage of the present invention is that a prototype article produced by the rapid prototyping process of this invention is not required to remain within a single processing chamber throughout the duration of the process, but instead is removed from the process chamber with the build chamber in which the prototype was originally built. As a result, a second build chamber can be positioned or installed in the process chamber to enable the manufacture of a second prototype while the previous prototype is cooled, thereby enabling different process steps to be conducted simultaneously on different prototypes within a single processing system and in the course of a single process cycle. As such, the overall efficiency of the prototyping process of this invention is significantly improved over prior art rapid prototyping processes, in which prototypes were required to remain within the same chamber throughout the processing cycle.

In addition, it can be appreciated that the build chamber of this invention is adapted to minimize chemical reactions with the prototype, such that the physical integrity of the prototype is not compromised by the enhanced efficiency of the process. The construction of the build chamber results in a cost-efficient apparatus that is specially configured to operate in cooperation with the primary process chamber for the purpose of providing a protective atmosphere for the prototype.

Finally, the rapid prototyping process of this invention is characterized by advantages associated with prior art processes, including the ability to fabricate prototypes having complex geometries without the use of prototype tooling. As such, prototypes fabricated in accordance with this invention are deliverable within a period drastically shorter than traditional prototyping methods.

Other objects and advantages of this invention will be better appreciated from the following detailed description.

BRIEF DESCRIPTION OF THE DRAWINGS

The present invention will now be described, by way of example, with reference to the accompanying drawings, in which.

DETAILED DESCRIPTION OF THE INVENTION

Figure 1:
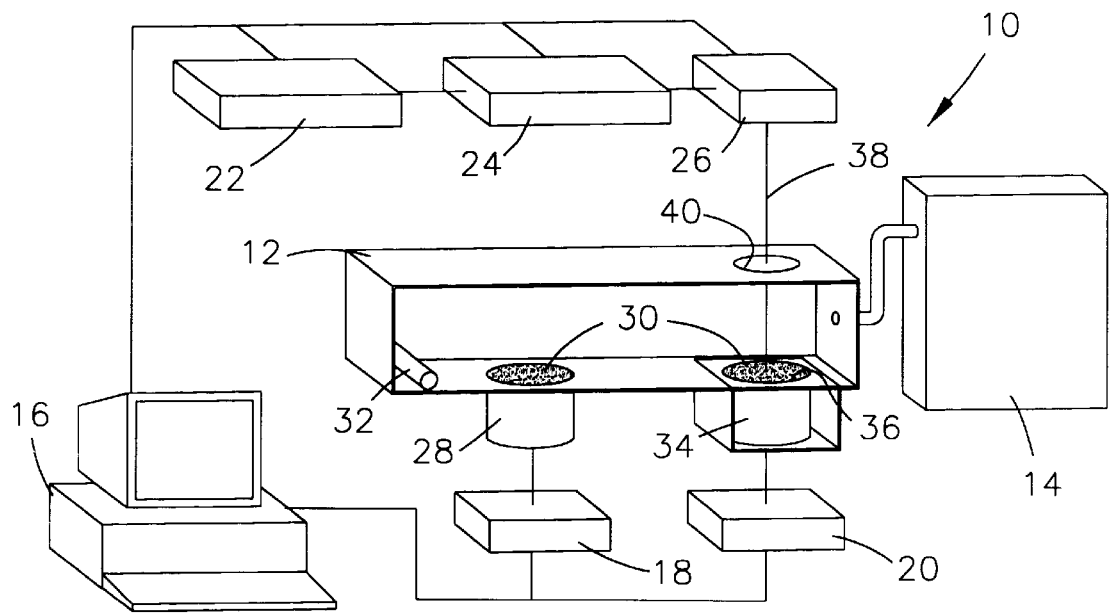
FIG. 1 is a schematic representation of a rapid prototyping system in accordance with a preferred embodiment of this invention.

FIG. 1 represents a rapid prototyping system 10 of a type particularly suitable for use in the process on this invention. The system 10 is generally composed of a primary process chamber 12 whose interior atmosphere is controlled with a suitable environmental control unit 14. The environmental control unit 14 serves to maintain an atmosphere that will not react with a prototype (not shown) processed within the process chamber 12. Also shown in FIG. 1 is a processor 16 that controls a feed motor 18, a build motor 20, and a laser generating system composed of a laser 22, optics 24 and galvanometers 26. The processor 16, represented by a computer in FIG. 1, serves to synchronize the operation of the motors 18 and 20 and the laser generating system, such that the efficiency of the overall process is promoted and the required dimensional precision for the prototype is achieved.

The function and operation of the above equipment are generally as follows. The computer 16 is programmed to control the operation of the feed motor 18, such that a suitable material will be dispensed by a feed cylinder 28 into the process chamber 12 at appropriate intervals during the process. Preferably, the feed cylinder 28 dispenses a powdered or granular material 30, which can generally be any material capable of being pulverized and fused or sintered, including ceramics, metals, polymer-coated powders, and thermoplastics such as a polycarbonate, nylon or investment casting wax. A roller mechanism 32 within the process chamber 12 is then activated to distribute the material 30 over the lower surface of the chamber 12, including a platform 36 formed in the chamber floor by a build cylinder 34. The build cylinder 34 is controlled by the build motor 20, and is retracted with each subsequent cycle of the roller mechanism 32 such that additional material 30 will be successively collected on the platform 36 as the platform 36 is lowered.

With each operation of the roller mechanism 32, a laser beam 38 is generated by the laser 22, focused and collimated by the optics 24 and, based on feedback from the galvanometers 26, regulated by the computer 16 at a desired power level. The beam 38 is then directed through a port 40 in the process chamber 12 and toward the material 30 on the platform 36. By selectively moving the beam 38 along a predetermined path dictated by coordinates entered in the computer 16, a portion of the material 30 on the platform 36 is sintered and fused to form a single layer or tier of the desired prototype. The beam 38 is focused such that sintering occurs only within the upper exposed level of material 30 on the platform 36, though sufficient heat is generated within the material 30 to cause bonding between it and the underlying layer. Successive passes are made by the laser beam 38 with each cycle of the feed cylinder 28, rolling mechanism 32 and build cylinder 34, with the individual layers formed by each cycle being fused together to form the prototype. The unexposed material on the platform 36 and in process chamber 12 remains in powder form, such that the prototype can be readily lifted from the remaining powder at the end of the process cycle.

To the extent described above, the rapid prototyping system 10 is generally referred to as a selective laser sintering (SLS) technique, and within the knowledge of one skilled in the art. Accordingly, the specific operating parameters for the individual system components will not be discussed in significant detail. It is generally sufficient to note that the feed cylinder 28, roller mechanism 32, and build cylinder 34 are typically operated to successively form and fuse layers having thicknesses on the order of up to about 0.5 millimeter, though lesser or greater thicknesses are foreseeable, depending on the particular geometry of the prototype being produced. Furthermore, the laser 22 will generally be selected on the basis of the particular conditions of the process, including the specific type or types of fusible materials used. In practice, a $CO_2$ laser has been found to perform particularly well with the system 10 described, though other lasers known or developed in the art could also be used.

For the purpose of fabricating prototypes from reactive materials, it is preferable that the environmental control unit 14 maintain within the process chamber 12 a nonreactive atmosphere in order for such prototypes to exhibit suitable mechanical strength. For this reason, the process chamber 12 is preferably adapted to flow an inert gas, such as nitrogen or argon, over the prototype and through the build cylinder 34 in order to maintain a nonreactive atmosphere in the chamber 12, as well as assist in maintaining the chamber 12 at a uniform temperature. In the prior art, this requirement for maintaining a nonreactive atmosphere has necessitated that a prototype remain within the process chamber 12 until the prototype has sufficiently cooled to the point where it is no longer susceptible to chemical reactions. According to the present invention, this burdensome requirement is eliminated by the build chamber 34, which is configured to be separable from the process chamber 12 and thereafter used as a separate cooling chamber.

As described above and illustrated in FIG. 2, the build chamber 34 includes the platform 36 on which a prototype 48 is produced. A shaft 46 is connected to the platform 36, and is coupled to and controlled by the build motor 20 to cause the platform 36 to be raised and lowered within the build chamber 34 as required by the prototyping process. The build chamber 34 accommodates a removable cover 50, which together with the build chamber 34, is adapted to cause a suitable nonreactive gas, such as nitrogen or argon, to be drawn around the prototype 48 between one or more inlets and outlets 42 and 44, respectively. A suitable arrangement is for the gas to be supplied from a pressurized source to the inlet 42, while a vacuum pump (not shown) draws the gas around the prototype 48 and toward the outlet 44. The temperature and flow rate of the gas through the build chamber 34 is generally established so as to achieve a suitable cooling rate for the prototype 48 contained within.

Figure 2:
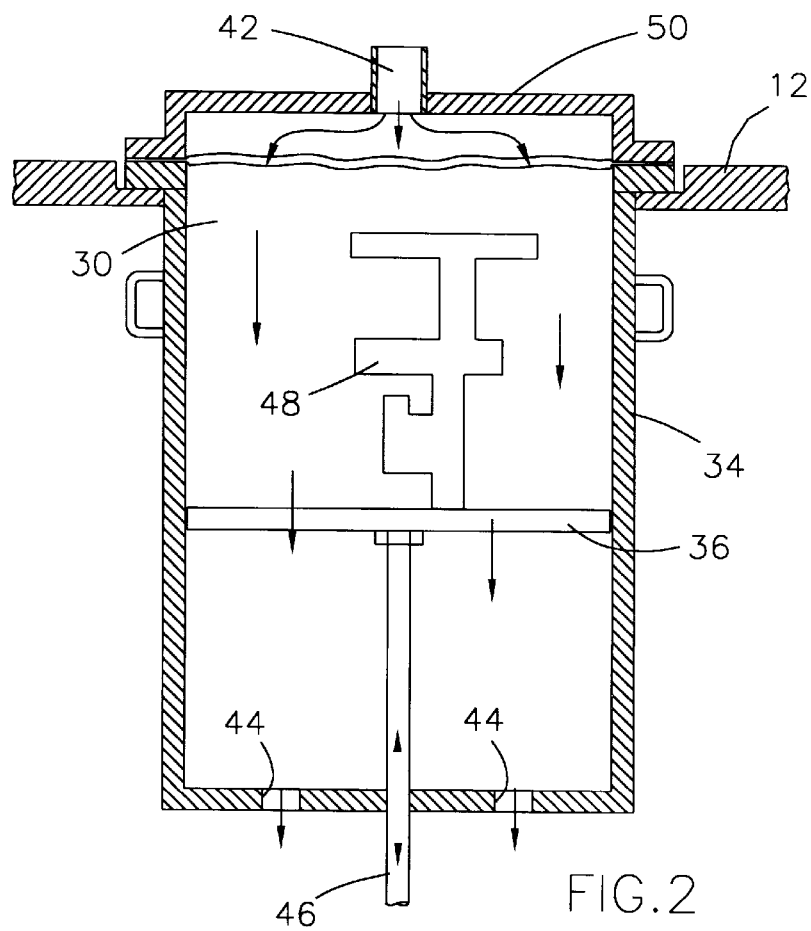
FIG. 2 schematically shows the build chamber of the prototyping system of FIG. 1.

In use, the prototype 48 is produced within the process chamber 12 as previously described. At the beginning of a cycle, the platform is approximately flush with the lower surface of the process chamber 12, as generally shown in FIG. 1. After fusing a layer of material 30 on the platform 36, the build motor 20 causes the shaft 46 to lower the platform 36 a programmed distance, after which another layer of material 30 is deposited and fused while on the surface of the platform 36. These steps are repeated until the prototype 48 is completed, as represented in FIG. 2. Unexposed material 30 on the platform 36 remains in powder form, and is retracted into the build chamber 34 along with the prototype 48. In order to promote the structural integrity of the prototype 48, a final pass can be performed by the laser beam 38 over the entire exposed surface of the prototype 48 so as to further fuse or sinter the material 30 at the surface of the prototype, and thereby render the surface more resistant to penetration by a reactive agent.

As noted previously, the process chamber 12 is preferably adapted to flow an inert gas over the prototype 48 and through the build chamber 34 during operation of the chamber 12. In accordance with this invention, following fabrication of the prototype 48, the build chamber 34 is detached from the process chamber 12 while the prototype 48 and the unexposed material 30 remains within the chamber 34. As the chamber 34 is detached, the cover 50 is moved into place to prevent the entry of air. Prior to detaching the build chamber 34, a cooling flow can be initiated through the unexposed material 30 and around the prototype 48, thereby inhibiting the flow of air into the chamber 34 until the cover 50 is in place.

Once the build chamber 34 and its enclosed prototype 48 are removed as a unit from the process chamber 12, the build chamber 34 can be attached to any suitable fixturing that will promote the cooling process. As noted above, cooling is preferably accomplished with an inert gas introduced into the build chamber 34 through an inlet 42, which is caused to flow through the unexposed material 30 and over and around the prototype 48 as it is drawn toward the outlets 44.

From the above, it can be seen that an advantage of the present invention is that a prototype part produced by the rapid prototyping system 10 shown in FIG. 1 is not required to remain within the process chamber 12 throughout the duration of the prototyping process, but instead is removed with the build chamber 34 where the final processing stage is performed. As such, the process chamber 12 can be immediately used for the next sintering operation with a second interchangeable build chamber 34, while a cooldown cycle is performed within the build chamber 34 housing the recently-sintered prototype. Consequently, the rapid prototyping process of this invention enables different process steps to be conducted simultaneously on different prototypes within a single process system and during a single process cycle, resulting in an enhanced overall efficiency for the process.

Another advantage of this invention is that the build chamber 34 provides an uncomplicated apparatus for preventing chemical reaction of a prototype, such that only a modest increase in the cost of the system 10 is incurred, while having a significant positive impact on process efficiency. As such, the build chamber 34 enhances efficiency without compromising the physical integrity of a prototype. Furthermore, the construction of the build chamber 34 results in a cost-efficient apparatus that is specially configured to operate in cooperation with the primary process chamber 12 for the purpose of providing a protective atmosphere for the prototype. Because the build chamber 34 is specifically configured to perform a cooling cycle, the efficiency of a cooldown cycle conducted within the chamber 34 can be significantly higher than that possible within the primary process chamber 12. As a result, the build chamber 34 can be controlled to affect or optimize the physical characteristics of a prototype, depending on the desired application.

While our invention has been described in terms of a preferred embodiment, it is apparent that other forms could be adopted by one skilled in the art. For example, sintering or fusing equipment, materials and methods could be adopted other than those suggested here. Accordingly, the scope of our invention is to be limited only by the following claims.

What is claimed is:

1. A rapid prototyping process comprising the steps of:
    forming a prototype within a process chamber that generates the prototype on a movable platform within a build chamber through sequentially depositing a layer of material on the platform, fusing the layer of material together, and then lowering the platform so as to allow depositing of a subsequent layer of material on the platform, the depositing, fusing and lowering steps being repeated until the prototype is finished;
    detaching the build chamber from the process chamber with the prototype remaining within the build chamber; and
    cooling the prototype within the build chamber.

2. A rapid prototyping process as recited in claim 1 wherein the detaching step further comprises delivering a cooling medium to the build chamber such that the prototype is enveloped by the cooling medium prior to detaching the build chamber from the process chamber.

3. A rapid prototyping process as recited in claim 1 wherein the fusing step further comprises fusing the layer of material to a preceding layer of material.

4. A rapid prototyping process as recited in claim 1 wherein the material is a powered or granulated material.

5. A rapid prototyping process as recited in claim 1 wherein the material comprises at least one material selected from the group consisting of ceramics, metals and polymers.

6. A rapid prototyping process as recited in claim 1 wherein the detaching step further comprises protecting the prototype from a chemical reactive agent.

7. A rapid prototyping process as recited in claim 1 further comprising the step of forming the prototype to have a surface resistant to penetration by gas prior to the build chamber being detached from the processing chamber.

8. A rapid prototyping process as recited in claim 1 wherein deposition and fusing of the individual layers of material are controlled by processor means.

9. A rapid prototyping process as recited in claim 8 wherein the lowering step is also controlled by the processor means.

10. A rapid prototyping process as recited in claim 1 wherein the detaching step comprises the step of enclosing the prototype within the build chamber.

11. A rapid prototyping process comprising the steps of:
forming a three-dimensional prototype within a process chamber that generates the prototype on a moveable platform within a build chamber coupled to the process chamber, the forming step comprising the sequential steps of depositing a layer of powered material on the platform, fusing the layer of powered material using a laser beam while simultaneously fusing the layer of powdered material to a preceding layer of powdered material on the platform, and then lowering the platform so as to allow deposition of a subsequent layer of powered material on the platform, the depositing, fusing and lowering steps being repeated until the prototype is finished;
detaching the build chamber from the process chamber with the prototype remaining within the build chamber while preventing chemical reaction of the prototype; and
cooling the prototype within the build chamber while flowing a nonreactive cooling medium around the prototype.

12. A rapid prototyping process as recited in claim 11 wherein the detaching step further comprises delivering the cooling medium to the build chamber such that the prototype is enveloped by the cooling medium prior to detaching the build chamber from the process chamber.

13. A rapid prototyping process as recited in claim 11 wherein the powdered material comprises at least one material selected from the group consisting of ceramics, metals and polymers.

14. A rapid prototyping process as recited in claim 11 wherein the detaching step further comprises flowing an inert gas around the prototype.

15. A rapid prototyping process as recited in claim 11 further comprising the step of forming the prototype to have a surface resistant to penetration by gas prior to the build chamber being detached from the processing chamber.

16. A rapid prototyping process as recited in claim 11 wherein deposition, fusing and lowering steps are controlled by processor means.

17. A rapid prototyping process as recited in claim 11 wherein the detaching step comprises the step of enclosing the prototype within the build chamber.

18. A rapid prototyping apparatus comprising:
a process chamber;
a build chamber detachably coupled to the process chamber, the build chamber comprising a moveable platform reciprocably disposed within the build chamber, means for enclosing the build chamber as the build chamber is being detached from the process chamber, and means for cooling the prototype within the build chamber;
means for sequencially depositing a fusible material on the platform;
means for fusing the fusible material on the platform so as to form a prototype within the build chamber; and
means for lowering the platform so as to allow depositing of a subsequent layer of a fusible material on the platform.

19. A rapid prototyping apparatus as recited in claim 18 further comprising processor means for controlling the depositing means, fusing means and lowering means.

20. A rapid prototyping apparatus as recited in claim 18 further comprising at least a second build chamber that is interchangeable with the build chamber.

* * * * *